United States Patent [19]
Cellario et al.

[11] Patent Number: 6,108,626
[45] Date of Patent: Aug. 22, 2000

[54] OBJECT ORIENTED AUDIO CODING

[75] Inventors: Luca Cellario; Michele Festa, both of Turin, Italy; Jörg Müller, Schwaikheim, Germany; Daniele Sereno, Turin, Italy

[73] Assignees: Cselt-Centro Studi E Laboratori Telecomunicazioni S.p.A., Turin, Italy; Robert Bosch GmbH, Stuttgart, Germany

[21] Appl. No.: 09/068,136

[22] PCT Filed: Oct. 25, 1996

[86] PCT No.: PCT/EP96/04669

§ 371 Date: May 14, 1998

§ 102(e) Date: May 14, 1998

[87] PCT Pub. No.: WO97/15983

PCT Pub. Date: May 1, 1997

[30] Foreign Application Priority Data

Oct. 27, 1995 [IT] Italy ................................. TO95A0869

[51] Int. Cl.[7] ............................. G10L 11/00; G10L 21/00
[52] U.S. Cl. ........................ 704/230; 704/205; 704/220; 704/219; 704/229; 704/278
[58] Field of Search ..................................... 704/200, 201, 704/205, 206, 219–223, 229, 230, 254, 255, 270

[56] References Cited

U.S. PATENT DOCUMENTS

| 4,464,783 | 8/1984 | Beraud et al. | 704/230 |
| 4,980,917 | 12/1990 | Hutchins | 704/254 |
| 5,353,373 | 10/1994 | Drogo De Iacovo et al. | 704/223 |
| 5,592,588 | 1/1997 | Reekes et al. | 704/278 |

FOREIGN PATENT DOCUMENTS

| 0 206 352 | 12/1986 | European Pat. Off. . |
| 0 627 827 | 12/1994 | European Pat. Off. . |

OTHER PUBLICATIONS

Globecom '90; IEEE Global Telecommunications Conference and Exhibition, p. 523–527, vol. 1, 1990, Kondo et al.

Object Oriented Design with Applications, 1991, G. Booch, 1991.

CCITT, Geneva, 1990, General Aspects of Digital Transmission Systems: Terminal Equipments.

Primary Examiner—David D. Knepper
Attorney, Agent, or Firm—Herbert Dubno

[57] ABSTRACT

Audio sources are coded by recognizing different classes of audio such as speech and music. The classes are used to select between coding algorithms and to provide object definitions. Objects have abstract and concrete classes which may further rely on parameters produced by linear prediction and subband filters to provide a frame-based bit stream of information. Each object in the bit stream has layers of information such as basic bit rate, coding parameters and enhancement parameters. The layers of information in each object allow altering selected parameters to manipulate audio signals.

56 Claims, 4 Drawing Sheets

OBJECT ORIENTED AUDIO CODING

The present invention relates to systems for processing and transmitting digitally coded audio signals and more particularly it concerns a method of and an apparatus for coding, manipulating and decoding audio signals (i.e. signals with bandwidth 20 Hz up to 20 kHz), independently of the specific signal content (e.g. speech signal, music signal, noise, etc.).

Those signals will also be referred to as generic audio signals and the coding-decoding of such signals will also be referred to as generic coding and decoding.

Preferably, but not exclusively, the method and apparatus find application in coding, manipulating and decoding the audio component of audio-visual (multimedia) signals.

It is known that audio-visual applications are becoming an area of convergence of telecommunications, computer and TV/film industries. Audio-visual coding methods are therefore being studied that take into account new expectations and requirements arising from the convergence. In particular the new methods must allow interactivity, high compression and/or universal accessibility; moreover, to take advantage of the rapidly evolving technologies, the methods must provide for a high degree of flexibility and extensibility.

Content-based interactivity involves the ability for the user to interact with and manipulate meaningful objects in an audio-visual scene. Currently, interaction is limited to computer graphics, i.e. to synthetic contents. New audio-visual applications are on the contrary expected to demand interaction also with natural or hybrid natural/synthetic audio-visual objects. High compression is required for efficient use of storage facilities and transmission bandwidth, and improvements in compression efficiency are important to enable high quality, low bit rate applications. Universal accessibility means that audio-visual data should be available over a wide range of storage and transmission media: in view of the rapid growth of mobile communications, access to the applications should be available via wireless networks and this implies a need for useful operation in error prone environments and at low bit rates.

As far as processing of the audio component is concerned, the requirement of flexibility includes the facility to vary the main characteristics of an encoder such as bit rate, delay, quality, bandwidth, channel error robustness, etc., by changing only the coding parameters within a permitted set of values. Such flexibility could allow use of a generic coder-decoder in a large variety of applications with different requirements. The availability of a generic coder-decoder would ease, in future digital systems, the exchange of audio data generated from different sources, simplifying network interfaces and reducing quality loss associated to transcoding among different standards. This will gain significant importance in view of the increased exchange of audio data between different (mobile or fixed) networks which are part of the future Universal Mobile Telecommunication System (UMTS). The generic coder should also accommodate the possibility to modify the coder-decoder parameters, in order the user can suite the service to his specific needs or equipment and the service provider can optimise the service in dependence of the system conditions. Additionally the coder should support the application of a configuration phase prior to the exchange of audio data. In such a phase the codes is configured depending on the service requirements determined by the user and the system.

No generic coder of that kind is known in the art. Some coding techniques, generally known as "embedded coding", admit bit rate reduction without changing the encoder characteristics. In other words, the encoder operates according to a fixed algorithm and the coded signal is so organised that part of the information can be lost or suppressed along the transmission path, and yet the decoder is still able to decode the signal, even if with a certain degradation in the quality, provided that at least an essential information is received. Examples are the embedded ADPCM (Adaptive Differential Pulse Code Modulation) coding disclosed in ITU-T standard G.726 or the embedded CELP (Coder Excited Linear Production) coding disclosed in U.S. Pat. No. 5,353,373. In both cases only a very limited number of reduction steps is possible; no intervention on the bandwidth is possible and, obviously, no different coding technique can be accommodated.

Document Globecom '90: IEEE Global Telecommunications Conference and Exhibition, 'Communications: Connecting the Future' (Cat. No. 90CH2827-4), San Diego, Calif., Dec. 2–5, 1990, ISBN 0-87942-632-2, New York, N.Y., USA, pages 523–527, Viol. 1, Kondo et al.: "Variable Rate Embedded ADPCM Coding Scheme for Packet Speech on ATM Networks", discloses an embedded coder (intended only for speech coding) in which:

only one coding algorithm (ADPCM) is used, whatever the characteristics of the input signal segment and both for coding the core information (most significant portion of the signal) and the enhancement information: the only flexibility admitted concerns the bit rate allotted to different signal portions (silence, voiced segment, unvoiced segment etc.); in any case, a limited number of bit rate steps is envisaged;

no provision for coding audio signals other than speech is made, and extending the discussions made in the document to other signals is not at all a trivial matter;

no intervention on the bandwidth and the bit rate of the coded bit stream in dependence on the nature of the signal and/or the user and system requirements is disclosed or suggested, nor is the possibility of manipulating the parameters of the coded signal.

EP-A-0 206 352 shows a coding unit in which the signal is fed to the individual elements operating with the same algorithm (ADPCM) even if they have different quantizing characteristics: thus, also in this case, there is no possibility of choosing a different coding technique for different audio signals or for the core/enhancement information. Also document D2 does not disclose or suggest the possibility of manipulating the encoded bit stream.

U.S. Pat. No. 4,464,783 discloses a coding unit in which the information about a certain parameter is included or is not included into the coded signal depending on whether there is a significant difference with respect to a previously coded block of samples, so that more bits can be allotted to other information. Reference is made in any case to a fixed-rate transmission.

It is therefore an object of the present invention to provide a method and an apparatus in which, at the coding side, an embedded coding is performed, so that decoding is still possible provided at least a "core" information is received, and which allow an actual scalability in both the bit rate and the bandwidth ("scalability meaning the possibility of reducing the bit rate or the bandwidth by a high number of fine steps, in almost continuos manner) both at the coder output and along a transmission path; allow use of different coding techniques for different signals; and also allow manipulation of the coding parameters.

In particular the method and apparatus of the invention are based on the object-oriented paradigm: the generic audio input signal is considered to be a combination of elementary audio objects and the elementary objects can be grouped together in macro-objects that can be linked to other information (like video information) and independently manipulated. Depending on the type of object being coded, the most suitable coding technique and, consistently with the system conditions, the most suitable bit rate and/or bandwidth can be selected. Along a transmission path from a coder to a decoder, a manipulation of the bit streams associated with individual macro-objects, or even with individual objects, is possible, thereby making it possible to cope with different system conditions, to allow user interaction with the scene and so on.

The invention will be better understood from the following description of a preferred embodiment, given by way of non-limiting example and illustrated in the annexed drawings, in which.

Figure 1:
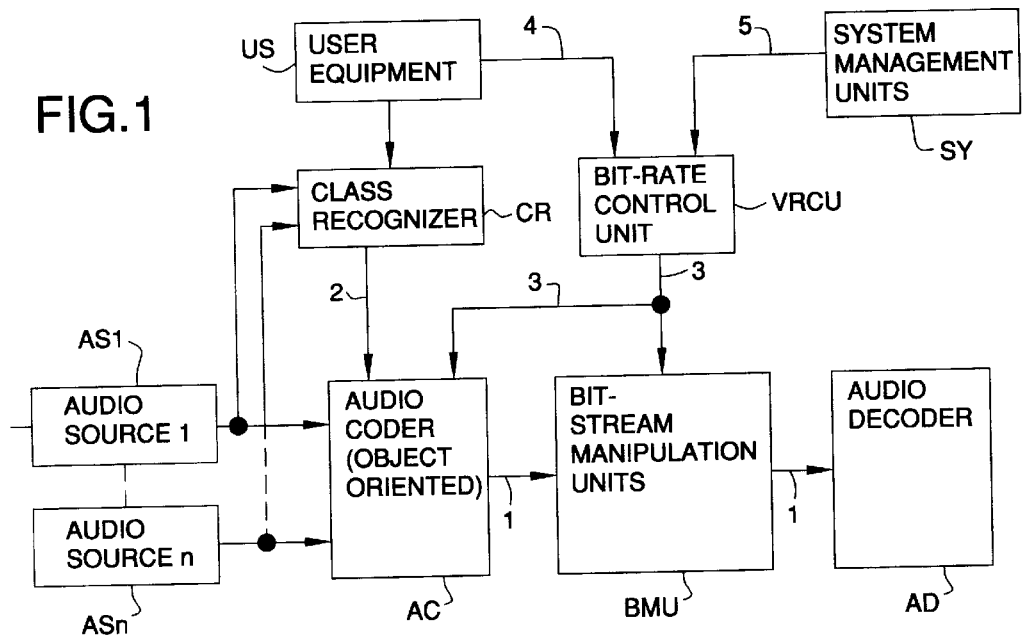
FIG. 1 is a schematic block diagram of the apparatus according to the invention.

Before describing the apparatus according to the invention, some considerations will be made about the object-oriented coding as applied to audio signals. The object-oriented coding technique has been already investigated in video coding due to the evident ease to recognise as "objects" a face, a chair, a background and so on. Thus, general principles of object-oriented coding are known per se and need not to be disclosed here, since they are widely disclosed in literature (see e.g.: "Object-oriented design with applications". The Benjamin/Cummings Publishing Company Inc., Redwood City, USA 1991). The technique has not so far been exploited in the field of audio coding, where the "objects" are not so apparent. A generic audio signal can be considered as a concatenation of subsequent time intervals (frames), in general of different duration. We can assume one of these frames to be the audio "scene". In one frame we can find several audio signals that can be isolated, concatenated or even superimposed. A typical example can contain a number of different speakers, different home, office or traffic noises, a comfort music in the background, some signalling tones and so on. Different kinds of signals can be considered as different classes, which can be further subdivided into subclasses in order to better exploit the local character of the audio signal, so as to achieve, among others:

the highest compression ratio with the best reproduced quality;

the highest flexibility to separate and modify each individual signal.

Using the terminology of the object-oriented paradigm, the classes will be hereinafter also referred to as "abstract classes" and the subclasses as "concrete classes". The set of parameters identifying a concrete class constitutes an "object".

In particular, the motivation for an object-oriented approach is based upon some basic features:

the possibility of creating a common framework for audio coding so as to develop changes and new modules in the audio encoder subsystem;

the possibility of an optimisation of coding techniques based on the use of a specific model for each class;

the possibility of independently manipulate audio objects.

The last consideration is of particular interest when considering new functionalities along with the audio services, in particular interactivity-related functionalities. These can include, for instance, the possibility to have a fast playback of a given message or the possibility to raise the level of one speaker and putting others in the background and so on.

A possible classification scheme is as follows:

talkspurt: this class includes the signals produced by people when speaking; it can represent the main abstract class for voice coding, but not the only one;

silence: this particular class can contain only a single object that is silence itself; it is essential to allow reproduction of a voice signal as well as of several other audio signals and allows significant bit saving for transmission;

noise: this class includes all those signals that refer to background noise and that are not produced by human beings; in general these signals convey a low amount of information and very raw models can be used to represent them;

music: this can consist of a single, very broad abstract class or, in the alternative, of a number of classes specifically tailored to a given instrumental source;

tones: this class accounts for pure sine wave signals; single objects belonging to this class as well as a proper combination of them can represent, for instance, all the signalling tones encountered in a transmission network.

As to the concrete classes, considering first the talkspurt, one possibility could be to associate a single concrete class with each possible type of sound or phoneme (or even with each allowable sequence of two or more sounds). This idea can lead to the realization of a speech codec as the cascade of a phonetic recognizer and a speech synthesizer. This way, a large number of different concrete classes is needed and in general they are language dependent. Furthermore, it could be very difficult to make a phonetic classification of talkspurt. A simpler approach could be to define a smaller set of concrete classes, each of them corresponding to a set of similar sounds. In the preferred embodiment described here however concrete classes tailored to model a specific segment of speech according to some acoustic properties are introduced. In this case the classification of talkspurts is not directly related to a phonetic classification, but the set of concrete classes is very small. To this end, the well-known classification of talkspurts in voiced and unvoiced speech segments and classification of voiced speech segments into sonorant and non-sonorant productions can be exploited. In particular the following concrete classes can be considered:

onset: initial part of a sonorant voiced speech segment;

steady-state: middle part of a sonorant voiced speech segment;

decay: final part of a sonorant voiced speech segment;

periodic: a non-sonorant speech segment;

aperiodic: an unvoiced speech segment.

It is to be appreciated that these classes also include short pauses which are part of an active segment of speech, for instance in plosive sounds.

For noise, concrete classes can be represented by steady state or transient noises; for music, concrete classes could be represented by sounds produced by different kinds of instruments or even synthesised sounds—if a single abstract class is considered—and by different phases of the sound (attack, decay . . . ).

The set of parameters of the individual concrete classes (i.e. the objects) will be transmitted. In the present invention, elementary objects relevant to one source (or to one link with other information, such as video, if an audio-visual transmission is considered) can be grouped into macro-objects, that can be manipulated independently.

A different approach could be considering one specific source signal as an abstract class (e.g. speech signal and music signal). This would imply to have some common concrete classes (e.g. silence), so that a same model will be adopted in more than one class. This means also that, in some cases, like that of a silence period separating a talkspurt from music (as can occur for instance when a comment precedes a musical excerpt), no information is available to discriminate between talkspurt and music and an arbitrary class identification for the specific signal has to be done. Hereinafter, however, when necessary, reference will be made to the first classification scheme proposed.

This being stated, as shown in FIG. 1, the apparatus according to the invention can be schematized by:

- a plurality of AS1 ... ASn of generic audio signals (where "generic" indicates, as said, any signal that can be preceived by a human being i.e. signals in a band from 0 to about 20 kHz);
- the audio encoder AC, which performs an object oriented embedded coding tailored to the specific input audio signal and introduces the individual objects into a conveniently organised bit stream that is forwarded over a transmission path 1 (transmission line, radio channel ...);
- a class-subclass recognizer CR, which identifies the abstract and concrete classes of an audio signal to be coded and supplies audio encoder AC with the classification results, through a connection 2, so that the encoder can apply the most appropriate source model (i.e. the most appropriate algorithm);
- one or more bit stream manipulation units BMU located along the transmission path which unit(s) receive(s) the bit stream produced by encoder AC or coming from a preceding manipulation unit BMU, and manipulates the individual macro-objects at the bit stream level so as to cope with user and system requirements; for sake of simplicity only one manipulation unit is shown here;
- a variable rate control unit VRCU, which determines the bit rate at the output from the encoder AC and controls the formation of the output bit stream of the encoder AC and/or the bit stream manipulation in unit BMU, as indicated by connection 3, by exploiting information on the user or system needs, supplied by user equipment US and/or by system management units SY through connections 4, 5, respectively.
- the audio decoder AD.

Note that, depending on the application, sources AS1 ... ASn could even be part of user equipment US.

Encoder AC has to encode the optimal parameters used to represent the specific concrete class and to emit the coded signal either at a variable bit rate, depending on the specific audio scene content and/or the specific sub-class considered, or at a fixed bit rate. The fixed bit rate can be either predetermined or specified by VRCU. As said before, encoder AC performs an embedded coding. As known, this means that a number of possible output layers is provided, with reference to the output bit rate and the related quality. A lower (basic) layer, a plurality of intermediate layers, and a total layer can be identified. The basic layer contains the minimum amount of information, hereinafter referred to as "core information", needed to decode an output signal. The total layer contains the whole of the information that can be transmitted, resulting in the maximum bit rate, the maximum quality and the maximum bandwidth of the coded signal; the intermediate layers provide an increase of the bit rate and the quality of the coded signal by successive steps from the basic layer to the total layer. The new information introduced at each step will be referred to as "enhancement information". At the decoding side or along the transmission path, it is possible to extract portions of the bit stream corresponding to one or more of said steps. In the example here described, the maximum bit rate is assumed to be 64 kbit/s and corresponds to the full band (20 kHz) of the audio signal. The basic layers for speech and music, with 4 kHz bandwidth, can correspond to a bit rate of about 6 kbit/s (actual bit rate for music and average rate for speech); the intermediate layers can correspond each to a step of 1.5–2 kbit/s.

An important feature is that encoder AC is able to operate according to different algorithms, including any standardised audio coding algorithm. In case an existing standard is used, the bit stream produced may form the core layer and the invention affords an upgrade of the coded signal, if the channel permits a higher bit rate or a larger bandwidth. At the decoding side, interoperability with the standard decoding algorithm is still ensured, by exploiting only the basic layer. Yet, if the overall channel capacity is exploited, a corresponding upgrade of the reproduced signal is obtained.

The structure of AC will be described more in detail later on with reference to FIG. 2.

Class/subclass recognizer CR could be an optimum recognizer which can identify which objects are superimposed on the scene and then provide different signals that can be handled in the best way in dependence of the class (i.e. using the optimal model). This would allow a great flexibility to the system because, also in this case, the receiver can decide which objects he wants to reproduce and even decide how to mix them. Preferably however a simpler solution can be adopted, which can be implemented with today's technology and in which, for a given audio scene, CR identifies one class at a time as the most probable and, as a consequence, allocates one specific model to be used for the specific signal filling the audio scene. Moreover, some information on the nature of the source (for instance, speech/music) can be supplied by the user through a connection 6 and exploited to simplify the object recognition procedure for each specific source.

Generally speaking, recognizer CR will be a signal processing unit which: distinguishes talkspurt (or generally an active signal), silence and noise by analysing the signal level (i.e. it has tasks corresponding to those of the so called voice activity detectors in case of speech); recognises speech, music (or different music instruments) and tones by carrying out a spectral analysis of the signal; in case of speech, recognises the concrete classes of talkspurt by performing a voiced/unvoiced classification for distinguishing onset, steady state, and decay and distinguishing periodic from aperiodic segments; analysis of spectral information and prediction gain allows recognition of periodic or aperiodic unvoiced signals; the distinction among onset, steady state and decay can be done either according to spectral information or simply by labelling the first segment as onset and the last one as decay.

The bit stream manipulation unit BMU is one of the key elements of the proposed architecture and allows achieving a great variety of functionalities by acting at the bit stream level. One of the main results attainable thanks to the presence of unit BMU is the possibility to modify the run-time quality of the service, which is strictly correlated to the bit rate, without changing the encoder configuration. The main tasks of unit BMU are:

reducing the data rate of the output bit stream, in order to fit into a specific channel capacity or to suite the user needs (scalability);

modifying the intrinsic parameters of any macro-object, or even of specific objects, by acting on the bit stream; this allows for instance modifying the level or the bandwidth or the quality of the different audio objects or yet changing the tonal or prosodic characteristics (multiple concurrent object manipulation).

The operation of BMU will be discussed in more detail later on.

Variable rate control unit VRCU, as said, has the main task of controlling the output bit rate from encoder AC. In alternative or in addition, bit rate control can be achieved through BMU. The information VRCU receives to this aim from user equipment US and system management units SY can generally represent the quality of service the user wishes to have and the quality of service the system can afford at that moment. An embodiment of a variable rate control unit, intended for use in mobile communication management, is described in European Patent Application EP-A-0 627 827. In that example, the information provided by user equipment and by the system management unit SY are related with source bit rate, redundancy to be associated with the signals emitted by the sources and the bit rate on the channel. One skilled in the art has no problem in applying the principles disclosed in that Patent application to different kinds of audio signal transmission.

Figure 2:
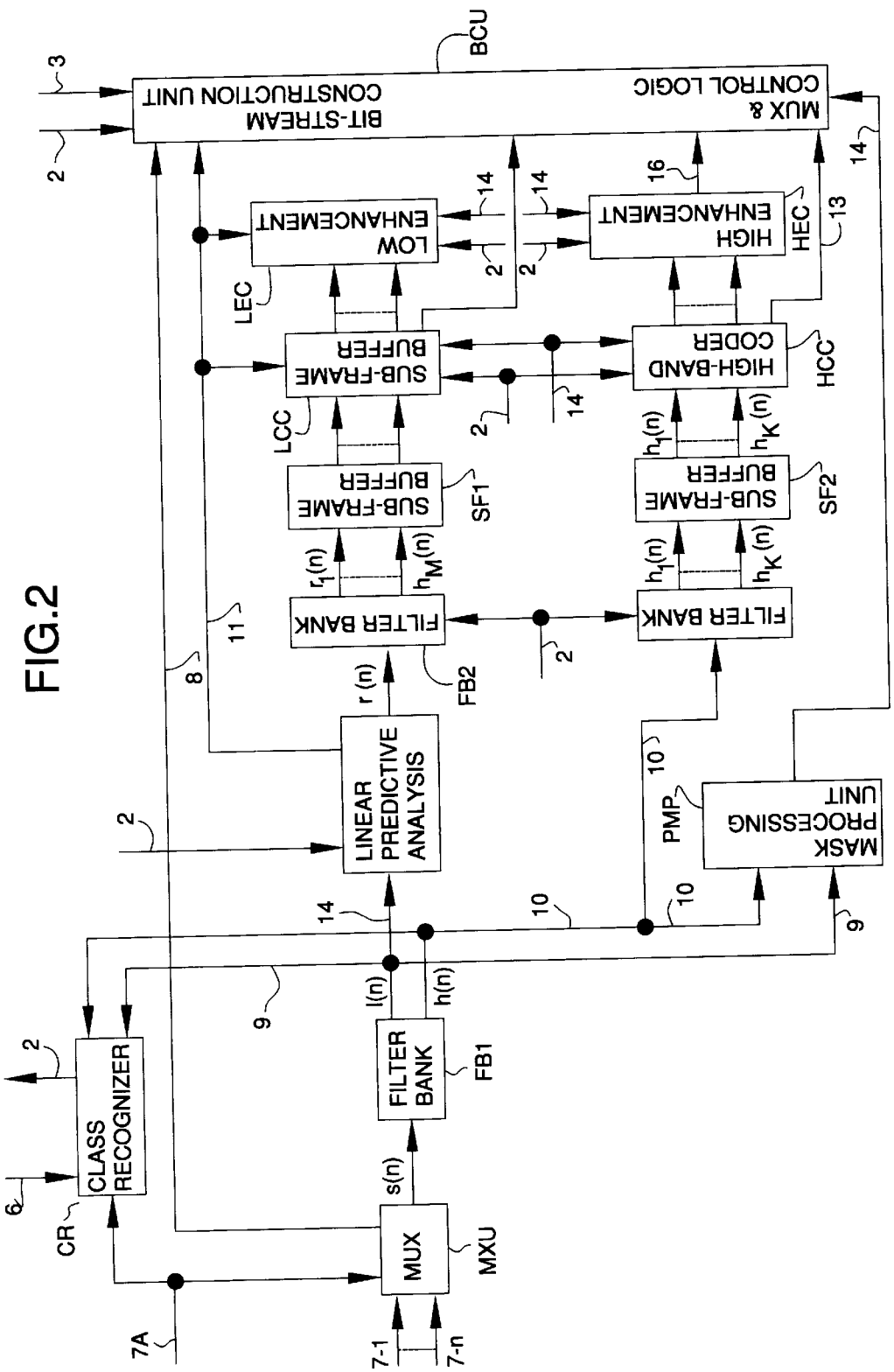
FIG. 2 is a block diagram of the encoder.

Reference is now made to FIG. 2, where class recognizer CR is again represented for clarity of explanation. The digital signals coming from the sources AS1 . . . ASn through lines 7-1 . . . 7-n and organised in frames containing each N samples (e.g. 256), are received by a multiplexer MXU, which forwards downstream for instance one frame per source at a time. The signals are associated with an information on the input sampling frequency $f_{s0}$ (connection 7A), which is supplied also to CR, in order the latter can properly analyse the signal. Multiplexer MXU acts also as upsampling unit and converts the input sampling frequency $f_{s0}$ to an internal sampling frequency $f_{s1}$. For instance, the internal sampling frequency $f_{s1}$ is the power of two immediately higher than $f_{s0}$ (e.g. if $f_{s0}$ is between 16 and 32 kHz, $f_{s1}$ is 32 kHz; if $f_{s0}$ is between 32 and 48, the signal is upsampled to 64 kHz). The advantage of this adaptation is that the subsequent splitting into subbands is independent of the input sampling frequency. The upsampling is disabled when the input signal sampling frequency is 8, 16 or 32 kHz.

For some specific applications (e.g. voice editing, multi-speaker applications, audio object linked to a video object . . . ) a group of bits coding the source identity is introduced into the output stream by a bit stream construction unit BCU, which will be described hereinafter. The information on such identity is provided to BCU from MXU, through a connection 8, or from CR, if an aggregation of macro-objects is performed there. The following description however assumes that each source is independently encoded.

The frame s(n) of audio signals outgoing from multiplexer MXU are fed to a first filter bank FB1, which decomposes the input signal into a low band l(n) and a high band h(n), which are presented on connections 9, 10 respectively. For instance, low band l(n) can comprise the speech band and range from 0 to either 4 kHz or 8 kHz, depending on whether a narrow band or a wide band speech compression scheme is desired. The described exemplary embodiment of the encoder assumes that the user provides class recognizer with some information on the signal content such that the class/subclass recognition can be performed separately on signals of the low and high bands. This obviously simplifies the structure of the recognizer.

The low band signals l(n) are fed to a linear prediction analysis unit LPA where the short term and long term prediction coefficients are calculated. The coefficients are fed through a connection 11 to bit stream construction unit BCU and to units LCC, LEC (described later on) performing the actual coding algorithms. LPA can be enabled or disabled depending on the classification results. Linear prediction techniques are especially efficient when applied to the speech signals in the band 0–4 kHz or 0–8 kHz, but linear dependencies are present also in certain music signals (especially at low frequencies) and can be removed by exploiting these predictors. Linear production analysis can be carried out in any of the manners known in the art.

The residual signal r(n) obtained as a result of linear prediction analysis is fed to a further filter band FB2 which further decomposes the audio signal according to the class/subclass information and generates a first group of subbands $r_1(n) \ldots r_M(n)$. Depending on the available bit rate, all subbands or only a subset thereof are considered in the quantization process, as will be explained later on.

A similar filter bank FB3 performs a decomposition of the high-band signals h(n), again according to the class/subclass information, thereby generating a second group of subbands $h_1(n) \ldots h_K(n)$.

The type of decomposition (a decomposition into equally spaced subbands or a decomposition adapted to the critical frequency bands) can be configured. Moreover, the filters are configurable so as to generated subbands of predetermined bandwidth, whether constant or not, independently of the sampling frequency. In an exemplary embodiment, the 20 kHz band is subdivided into 20 subbands each with a 1 kHz bandwidth; the first four subbands form the low band.

Advantageously, the frames outgoing from filter bands FB2, FB3 are further subdivided into subframes in respective units (buffers) schematized by blocks SF1 . . . SF2. The length of the subframes, and hence the coding delay, is selectable depending on the user and application requirements. Subdivision of a frame of N samples into a L subframes of N/L samples, which corresponds to an additional decomposition of the signal in the time domain, is a usual operation in speech coding technique and does not require any detailed description. As a result of the subdivision first into subbands and then into subframes, the audio signal is decomposed into "time-frequency slots" corresponding to N/L samples on the time axis and to a bandwidth of F_k (depending on the filter bank configuration) on the frequency axis.

The subframes of subbands $r_1(n) \ldots r_M(n)$ are fed to a first set of coding units LCC, one for each subband, which generate the core information for the low band signals. The core information is set to bit stream construction unit BCU through a connection 12. Each unit in LCC can operate according to a plurality of coding algorithms, and the proper algorithm can be selected for instance depending on the user and/or system requirements and/or on the classification results. In particular different algorithms will be useful for speech and music. Any coding algorithm defined by already existing international standards can also be used. If a standard coding algorithm operating on a 4 (or 8) kHz bandwidth and already providing for linear prediction analysis is utilised, unit LPA and filter bank FB2 are deactivated. Taking into account that the low band signals are generally speech signals and most standardised speech coders operate on signals with bandwidth 4 kHz (and sometimes 8 kHz), filter bank FB2 could even be located, and preferably is located, downstream LCC. This makes interoperability of the generic coder with standard coding algorithms easier. In that case, LCC will of course comprise a single unit.

Advantageously, the algorithms adopted for speech coding will be analysis-by-synthesis techniques.

As an ad-hoc coder for the core coding of the low band signals could be a multi-rate CELP coder exploiting two innovation codebooks. In that coder, the results of the classification determine the set of parameters that are better suited to represent the current speech segment so that a subset of possible coding rates is selected; then, in the analysis-by-synthesis loop, the minimum rate required to achieve the desired quality is determined by exploiting some objective measures on the locally synthesised signal. A minimum bit rate (~0.25 kbit/s) will for instance correspond to transmission of only background noise (abstract class "noise") and a maximum bit rate (about 11 kbit/s) will correspond to transmission of short-term and long-term parameters and of contributions from both innovation codebooks (abstract class "talkspurt"; concrete class "periodic"). Intermediate bit rates could be obtained by transmitting: noise and short term parameters; short term and long term parameters; short term parameters and one innovation contribution, etc. Multi-rate CELP coders in which the output bit rate is chosen depending on the signal classification are known in the art.

In case of low band music signals, the applicable coding algorithms can be based on vector quantization. A shape/gain vector quantizer is applied to each time-frequency slot or to combinations thereof. The quantization is carried out at each subframe in two steps, in the first of which the shape is quantized, while in the second the gain is quantized. Quantization can be performed either in a frequency domain or in the time domain. It is possible to not quantize certain time-frequency slots and to interpolate them taking quantized surrounding slots (in time, in frequency or time-frequency) into account. Vector quantization is a quite conventional technique and needs no particular description. It is to be noted that vector quantization readily supports complexity scalability (which is a desired feature of the coder), in that any parameter to be transmitted can be searched in only a subset of the respective codebook. Hence codec complexity and audio quality can be easily negotiated. Moreover vector quantization readily supports the class/subclass approach, in that specific codebook tables can be assigned to each audio class/subclass.

The subframes of signals belonging to the high band are fed to a second set of coding units HCC which generate the core information of the high band and send such information to BCU through a connection 13. Also coding unit set HCC can operate according to a plurality of coding algorithms, advantageously based on vector quantization, for each of the respective subbands.

The core algorithms adopted must obviously be communicated to the decoder at the call set up.

The coding may also exploit a suitable perceptual model, for instance a model based on the so called "simultaneous masking effect", i.e. the phenomenon by which a weak signal (in particular the quantization noise) is made inaudible by a stronger signal of close frequency (in particular, a tone in the audio signal). Utilisation of the perceptual model requires determination of suitable masking thresholds, which determination is carried by a processing unit PMP either starting from the individual subbands, or by spectral analysis of the audio signals of the high and low band. In the first case PMP will be connected to the output of filters bank FB2, FB3, in the second to the output of FB1, as shown in the drawing. The information related to the perceptual model (generally, information about a global masking threshold) are sent by PMP to the coding unit sets LCC, HCC and to bit stream construction unit BCU through a connection 14. Such information can also be supplied to FB2 and FB3, if it desired to take the perceptual model into account when splitting the signals into subbands.

It is to be pointed out that the one core information to be inserted into the coded signal may comprise contributions from only some of the subbands, depending on the available bit rate, on the nature of the signal and/or the perceptual model. The decision on which subbands must provide a contribution to the core information will be taken by BCU. Thus, an interaction between BCU and LCC, HCC is provided yet, for sake of simplicity, the drawing only shows connection 12, 13 conveying the coded signals to BCU.

Coding units LCC and HCC are followed by respective third and fourth sets of coding units LEC, HEC, similarly comprising a unit for each subband, which generate the enhancement information to be inserted into the coded signals. Advantageously, the coding units in the third and fourth sets operate according to vector quantization techniques and, for instance, they will code the quantization error at the output of the respective core coding unit in LCC, HCC. The enhancement information is set from LEC, HEC to BCU through connections 15 and 16, respectively. Each unit in LEC, HEC will comprise as many stages as are the steps envisaged for the bit rate increase. In the preferred embodiment of the invention, up to 7 enhancement stages can be applied to a subband. Also for the enhancement coding a plurality of different algorithms are possible and the set of algorithms finally applied is signalled in the configuration phase. The type of algorithms applied to a given subband depends on the concrete class as well as on the perceptual model, if such a model is exploited. Also the type of core algorithm used in the subband may be taken into account. Depending on the available bit rate, on the nature of the signal and/or the perceptual model, BCU will determine which subbands are to be enhanced and which and how many enhancement stages are to be allocated to a certain subband. Thus, also an interaction between BCU and LEC, HEC is provided: yet, for sake of simplicity, the drawing only shows connections 15, 16 conveying the coded signals to BCU.

The linear prediction analysis parameters, the coded signals, the class/subclass information as well as the source identity, if required, are associated by unit BCU to suitable service information (overheads) concerning i. a. number of macro-objects, number of subbands, number of enhancement stages for a subband, and combined into the embedded bit stream, in such a manner that the bit stream manipulation unit can extract and manipulate the portion of the bit stream which is of interest. The core and enhancement information will be organised in bit packets, where each packet is associated with a subband and a coding stage (core or enhancement) for that subband. Unit BCU will essentially consist of a multiplexer and a control logic which performs the operations necessary to determine which subbands are to be considered for the core coding and how many enhancement stags, if any, are to be applied to each of those subbands.

Actually, considering the numerical examples given before, it is clear that it is impossible to apply all of the coding stages to all subbands. This would require transmission lines at a bit rate quite higher than the 64 kbit/s at present envisaged and application of highly sophisticated classification schemes and perceptual models allowing a strong reduction in the bit rate produced by the coding units. Thus, a proper strategy is to be considered for selection by BCU of the subbands for which at least the core coding is to be performed and of the number of enhancement stages to be applied to such "active" subbands. A suitable strategy can be as follows.

A first step is determining the bandwidth for the output signal starting from the desired output bit rate: for instance, the bandwidth that can be allocated to predetermined threshold bit rates is set a priori and, for bit rate values intermediate between two consecutive thresholds, the output bandwidth is determined through linear interpolation and round off to the closest integer value. A suitable association bandwidth/threshold bit rate could be: 4 kHz for bit rates up to 16 kbit/s; 8 kHz for bit rate 24 kbit/s and 20 kHz for bit rate 64 kbit/s. Once determined the bandwidth (and hence the number of subbands), the core coding stage is applied provided the energy level of the signal within the band exceeds a given threshold, which may be fixed or may depend on the perceptual model. If the bit rate does not allow application of the core stage to all subbands, the threshold is increased and the step above is repeated. Generally, application of the core stage to all desired subbands will be always possible. After having allocated the core stages, a check is made on whether the bit rate allows insertion of enhancement stages. As an initial step of that check, the maximum number of enhancement stages can be allocated for each subband. If the bit rate allocated exceeds the available bit rate, a number of enhancement stages is disabled: to this aim, in each subband, the increase of signal-to-noise ratio afforded by each stage with respect to the previous stage is determined and the stages affording the lowest increases are disabled, independently of the band they belong to.

Instead of the increases in the signal-to-noise ratio, the decision on whether enabling or not a particular stage could exploit, as said, the simultaneously masking model: in this case, the enhancement stages with a noise below the masking threshold will be disabled first and then disabling will concern stages where noise exceeds the masking threshold by a smaller amount.

Both strategies of selection of the enhancement coding stages are substantially based on the evaluation of the quality increase afforded by each stage.

Figure 3:
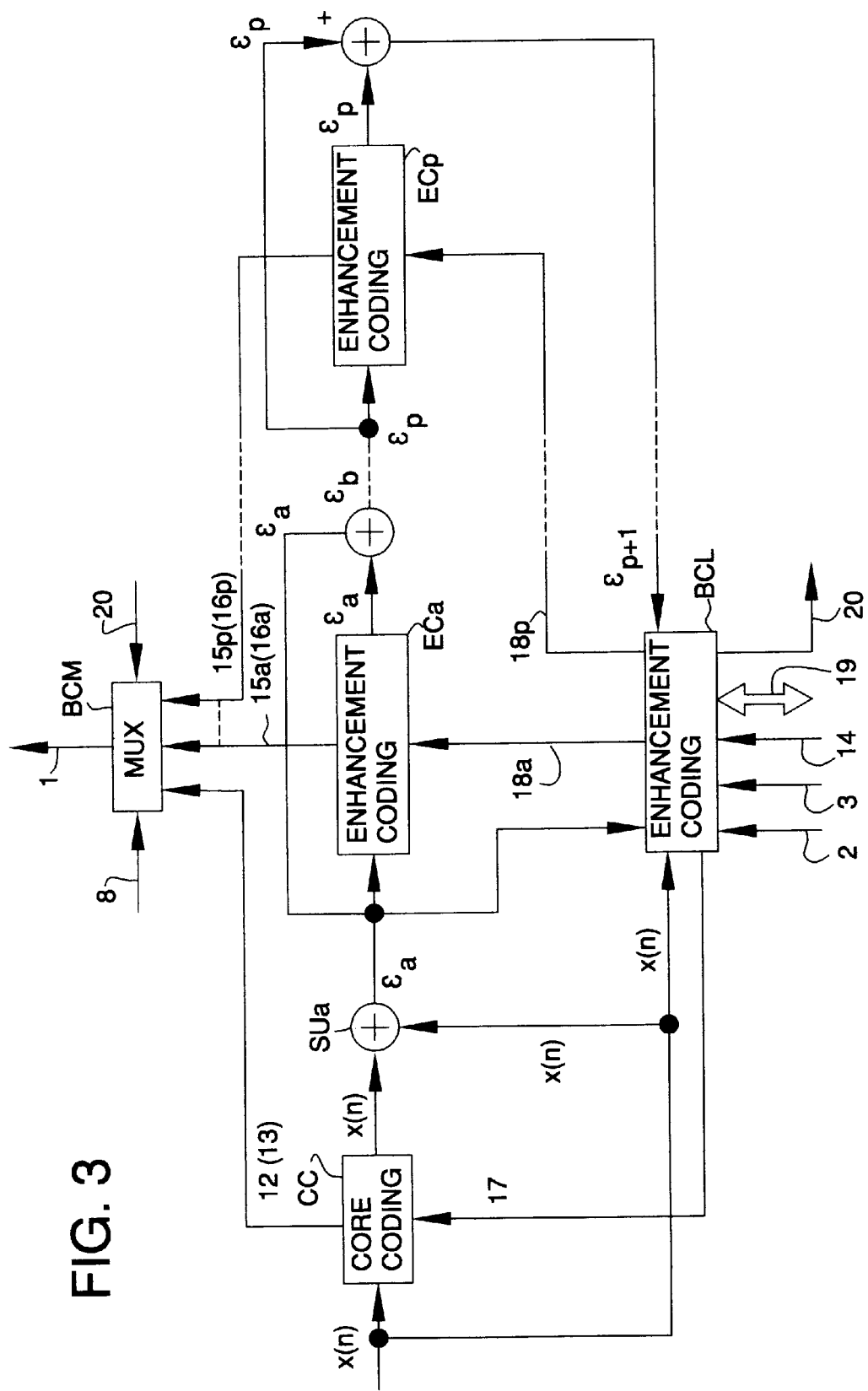
FIG. 3 is a more detailed block diagram showing connection of coding units in the encoder to a bit stream construction unit.

If the differential signal-to-noise ratio is exploited and assuming that splitting into subbands always takes place before the core coding, the connection between the coding units of a subband and bit stream manipulation unit can be as shown in FIG. 3. Here CC and ECa . . . ECp denote the core coding unit and respectively the different stages in the enhancement coding unit which are allotted to the considered subband in sets LCC, HCC and respectively LEC, HEC (FIG. 2). BLC, BCM denote the control logic and the multiplexer of BCU, respectively. BCL will receive the input signal x(n) of the core coding unit CC, calculates the energy of that signal and enables CC (connection 17) if the subband must contribute to the core information. For selection of the enhancement coding stages, at the input of the first enhancement stage, a subtractor SUa receives the input signal x(n) of core coding unit CC and a reconstructed signal $\hat{x}$ available within the unit itself, and calculates a quantization error $\epsilon_a(n)=\Sigma(x_i-\hat{x}_i)$ where $x_i$ is the generic sample in the subframe. Signal x(n) and quantization error $e_a$ are supplied to BCL which calculates the signal-to-noise ratio at the output of the core coding stage according to usual relation $\Sigma(x_i)^2/\Sigma(x_i-\hat{x}_i)^2$. Quantization error $\epsilon_a$ is also fed to the coding unit ECa which applies the proper enhancement coding algorithm to $\epsilon_a$ and generates the first stage enhancement information block on connection 15a (or 16a) as well as a reconstructed quantization error $\hat{\epsilon}_a(n)$. The latter is fed to BCL, for the computation of the signal-to-noise ratio at the output of the first enhancement stage and of the increment ΔSNR afforded by that stage, and to subtractor SUb of the second stage for the generation of the new quantization error $\epsilon_b$. The same organisation is repeated in the remaining stages. At the output of the coding unit ECp of the last stage the last value $\epsilon_{p+1}$ of the quantization error is computed and supplied to BCL. On the ground of the increments ΔSNR of signal-to-noise ratio after each stage of the band considered and of the other bands (supplied through connections schematized in the whole by double line arrow 19), if the band has to contribute to the enhancement information, BCL will emit, on one or more of wires 18a . . . 18p, a signal enabling the corresponding coding unit ECa . . . ECp to transfer its enhancement information block onto output 15a . . . 15p (16a . . . 16p). Enabling signals analogous to those present on connections 17, 18a . . . 18p will be sent to the coding units of the other subbands. Arrow 19 schematizes also the connections leading to the units of the other bands. A further connection 20 conveys from BCL to BCM the service information to be inserted into the overheads of the bit stream. The transfer of the information from BUM to path 1 may occur in different manners, as it will be explained later.

Figure 4:
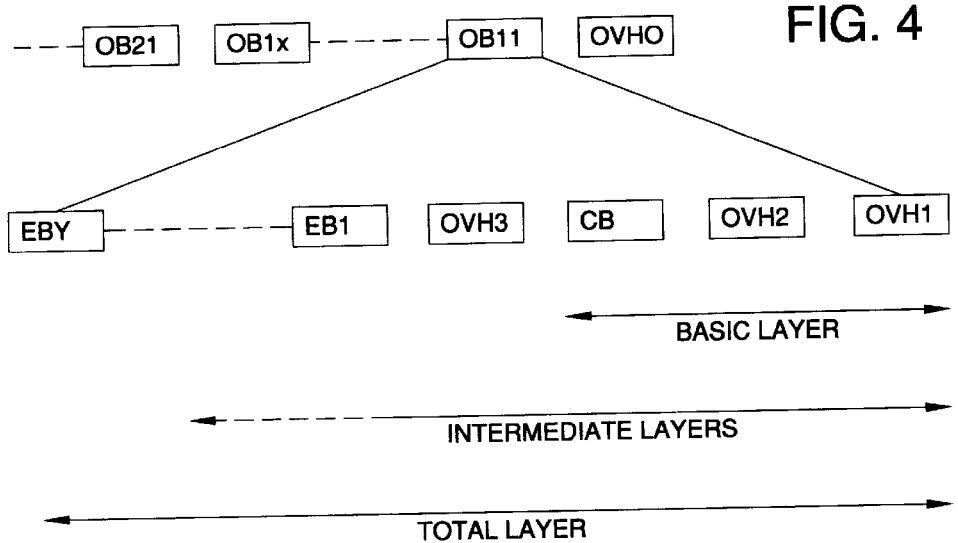
FIG. 4 shows the organization of the bit stream.

The bit stream organization at the output of BCU is shown in FIG. 4 in case of a plurality of sources and hence of macro-objects. The stream comprises a group of overhead bits OVH0 followed by the bit stream OB11 . . . OB1x, OB21 . . . relating to the macro-objects of the first, second . . . frames: the macro-objects, as said, contain all coding bits relevant to a particular source or to a link with other information in a frame. The overhead bits OVH0 identify how many macro-objects are included in the bit stream and contain also the information of the input and output sampling frequency. The input sampling frequency is the sampling frequency used when encoding the objects. The output sampling frequency is the sampling frequency that has to be used at the receiver end. Notice that bits OVH0 have to be sent only at the connection set-up. In each macro-objects, as shown for OB11, a first group of overhead bit OVH1 contains the information on the object classification (abstract and concrete class); a second group of overhead bits OVH2 indicates the number of subbands actually utilised (that is the subbands for which at least the core information is transmitted). Bits OVH2 are then followed by the core bit stream CB. Thus, OVH1, OVH2 and the CB altogether form the basic layer.

After the core bits, a third group of overhead bits OVH3 indicates the number of enhancement coding stages applied to each subband. Overhead bits OVH3 are then followed by the enhancement bits EB1 . . . EBy.

Within the core and enhancement bit streams CB, EB, the bit packets can be ordered in different manners. In particular an ordering by subband or an ordering by rank are possible. The rank will be linked to the energy level, for the core information, while for the enhancement information the rank is linked to the parameter (e.g. from the perceptual model) evaluated in a stage for deciding the application of the coding algorithm. The second solution entails of course in the overhead, due to the need of introducing in the packets information on the subband identity.

Coming now to the bit stream manipulation unit BMU (FIG. 1), it may manipulate the bit stream transmitted along path 1 either by changing the values of some parameters in the individual macro-objects or objects (level, pitch . . . ) or by scaling the bit rate.

As far as scaling is concerned, the operation of BMU is affected by the bit packet ordering adopted by the bit stream construction unit BCU.

If the subband ordering is adopted, the bit stream manipulation unit determines the number of coded subbands, with an algorithm similar to that used at the encoder AC, and discards all packets associated with a band for which no core information is to be considered. If the bit rate thus obtained stills exceeds the requested bit rate, further stages are eliminated: a possible choice could be that of discarding one packet for each band, starting from the uppermost band, and provided that the stage to be discarded is not the only stage allocated. After all bands have been tested once, a new cycle is performed starting again from the highest band to which a coding stage is still allocated. The procedure continues until the bit rate requested is attained or until only the core stage is allocated for all bands. If also with allocation of the core stage only the bit rate exceeds the desired bit rate, also core stages are eliminated, starting from the uppermost band.

If the rank ordering is on the contrary adopted, the elimination is immediate. As said, the rank ordering entails a bigger overhead and hence a reduction of the number of stages which can be allocated for a given bit rate during the coding phase. Yet, the same rules adopted at the encoder for building the bit stream can be adopted for discarding the stages in the bit stream manipulation unit, and hence the manipulation does not entail quality differences.

The above operation concerns a single macro-object. Yet the bit stream manipulation unit BMU (FIG. 1) allows a modification of all coding parameters by acting on the bit streams of the individual objects. For instance, when multiple concurrent audio macro-objects are being transmitted, the relevant data streams can in general have different bit rates in dependence of the actual information carried. One simple manipulation feature is the possibility to modify the level of each macro-object, or to modify the object elements of one speaker voice (pitch, spectrum, etc.), to modify the music model of one instrument and so on. Another possibility is to produce a single stream at a given bit rate (for instance, the maximum bit rate) from a number of elementary streams at that bit rate. This operation requires building, in the bit stream manipulation unit, two tables where each row is associated with a band and each column is associated with a macro-object. The first table will contain the number of stages allocated (or any other information extracted by the bit stream) for each band and for each macro-object and the second will contain the respective energy levels. The procedure of bit rate reduction is similar to that considered above in case of subband ordering with the difference that the subbands are not tested in order of decreasing frequency, but in order of increasing energy. In this manner, a dominant macro-object will obtain more rate and the overall quality will be better than that attainable by allotting all macro-objects a same bit rate.

We desire also to underline that the object manipulation can concern individual frames. This would mean, for instance, that if any audio object is linked to one visual object, there is the possibility to have an audio-visual zoom of the complex object.

Figure 5:
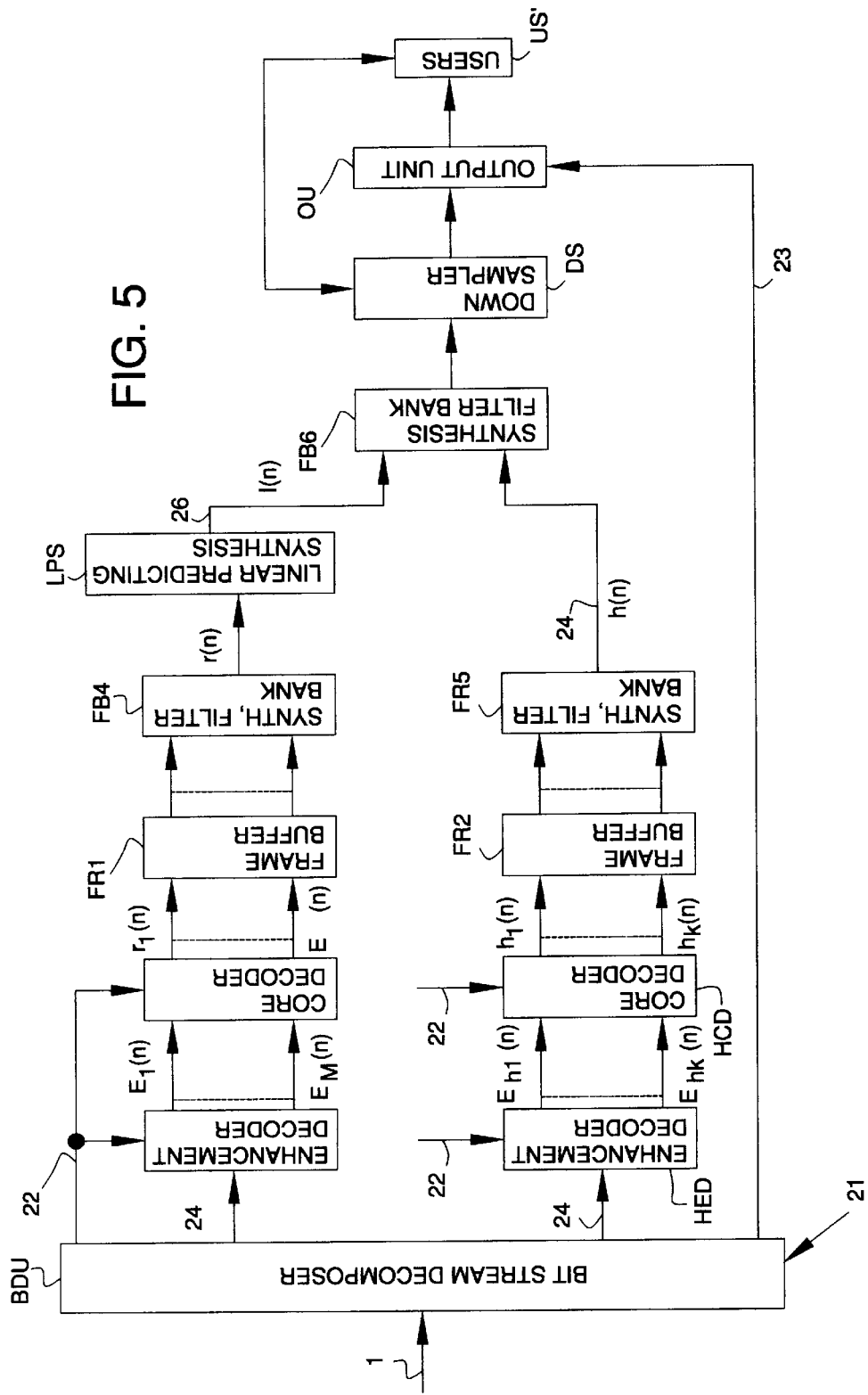
FIG. 5 is a block diagram of the decoder.

Reference is now made to FIG. 5, where the decoder is shown. All blocks of the decoder will receive, at the set up of the connection, information about the configuration of the corresponding blocks of the coder, so as to exactly perform complementary operations. It is assumed that the configuration information are received at a receiving or bit stream decomposing unit BDU, having complementary tasks to BCU, through a connection 21. For simplicity, the means for distributing such information to the decoder blocks are not shown. Receiving unit BDU receives the stream, possibly manipulated by BMU, from the transmission path, still denoted by 1, separates the class and identity information from the actual coded signal and present such information onto connections 22, 23, respectively. The coded signal stream is decomposed into the low band and high band streams, which are sent to respective enhancement decoders LED, HED through connections 24, 25. Decoders LED, HED, like coders LEC, HEC will comprise a set of units each associated with a subband and comprising as many stages as are the stages in LEC, HEC. The individual stages for the different subbands will be activated or not in dependence on whether or not the corresponding stages in the coders have been enabled. The enabling is controlled by BDU on the basis of the information contained in the overheads OVH1–OVH3 (FIG. 4). Each unit will perform a decoding algorithm complementary to the coding algorithm applied at the coding side. For decoding the individual objects, the decoders LED, HED need also to receive the class-subclass information.

The enhancement decoders send reconstructed quantization errors $E_{Li}(n)(i=1 \ldots M)$, $E_{bj}(j=1 \ldots K)$ to the respective core decoders LCD, HCD and the decoders provide reconstructed residual signals $f_i(n)$ for the subbands of the low band and reconstructed signals $\hat{h}_j(n)$ for the subbands of the high band. As for the enhancement, the class information is exploited. The reconstructed signals of the subbands are then fed to synthesis filter bands FB4, FB5, complementary to FB2, FB3 (FIG. 2), which reconstruct the residual signal $\hat{f}(n)$ and the high band signals $\hat{h}(n)$. After linear prediction synthesis of the residual signal in linear prediction synthesis unit LPS, the whole band of the original signal is reconstructed by synthesis filter band FB6 (complementary to FB1), which receives the reconstructed signals $\hat{l}(n)$, $\hat{h}(n)$ of the two bands through connections 26, 27. The signal outgoing from FB6 is downsampled, if necessary, in downsampling unit DS and sent to the users, schematically shown by block US', through an output unit OU which will associate the source identity with the reconstructed stream and, if necessary, sends different decoded macro-objects to different users. For downsampling, the information on the desired output sampling frequency $f_{os}$ is supplied by the user.

We desire also to outline that the audio object based approach efficiently supports error concealment techniques in the audio decoder if e.g. the bit stream has been transmitted in an error prone environment: specific error concealment algorithms can be applied for each abstract/concrete class combination.

It is evident that the above description is given only by way of non limiting example and that changes and modifications are possible without departing from the scope of the invention.

What is claimed is:

1. A method of processing digitized audio signals, comprising at least:

a coding phase in which a signal to be processed, organized into a sequence of frames comprising a predetermined number of samples, is split into a plurality of frequency bands which can be independently coded, and a coded signal is generated including information relevant to signals in at least selected ones of said frequency bands, the coding taking place according to an embedded coding technique such that the coded signal comprises a basic layer, containing the minimum amount of information ("core information") needed for decoding and corresponding to a minimum bit rate, a total layer, containing the whole of the coded information and corresponding to a maximum bit rate, and a plurality of intermediate layers which contribute to the coded signal by respective information blocks ("enhancement information") coding respective signal portions that cannot be represented by the only core information, and which cause an increase of the bit rate of the coded signal by successive steps from the basic layer to the total layer, the basic layer being generated by a first coding step and each block of enhancement information being generated by a respective second coding step; and a decoding phase, in which the information relevant to the different frequency bands included in the coded signal is independently decoded, in such a manner that for a frequency band for which both enhancement information blocks and the core information are to be decoded, the coded signals are submitted to a set of first decoding steps, the number of which is the same as that of the second coding steps performed for that band and in each of which one enhancement information block is decoded, and to a second decoding step in which the core information is decoded, whereas for a frequency band for which only the core information is to be decoded, the coded signals are submitted to the second decoding step only; and the decoded signals relevant to the different bands are recombined to build a reconstructed signal with bandwidth characteristics corresponding to those of the original signal;

characterized in that, during said coding phase, a two-stage classification is performed by which each audio signal to be coded in a given frame is allotted to one out of a plurality of abstract and to one out of a plurality of concrete classes of said one abstract class, the concrete classes being related with the characteristics of a signal portion and identifying elementary audio objects present in the frame and the abstract classes being related with the nature of an audio signal and identifying macro-objects resulting from a combination of elementary audio objects;

in that said first coding step for a given audio object is performed by means of a first coding algorithm selected out of a plurality of first coding algorithms and any second coding step for that given audio object is performed by means of a respective second coding algorithm selected out of a plurality of second coding algorithms, the choice amongst the plurality of said first and respectively second coding algorithms depending at least on the results of said two step classification; the coding phase generating, for each object, an object bit stream, containing all information relevant to a same concrete class for that audio signal in that frame, and a macro-object bit stream combining bit streams of different objects of a same to abstract class or different abstract classes and having bit-rate and bandwidth characteristics which depend on the choices made for said first and said second algorithms and on configuration information passed from a user equipment (US) to coding devices (AC) and/or on control information passed from a transmission system (SY) to the coding device;

in that the method further comprises, between the coding and decoding phases, a phase of manipulation of the bit stream generated by said coding phase, for the scaling of the coded bit stream in dependence of information about the abstract and concrete classes, included in the coded bit stream, and of said configuration and control information;

and in that in said decoding phase, said first decoding step is performed by means of a respective algorithm complementary to the second algorithm selected in the coding phase to generate the enhancement information block to be decoded in that step, and the second decoding step is performed according to an algorithm complementary to the first algorithm selected in the first coding step; each of said first and second decoding algorithms being selected out of a plurality of first and second decoding algorithms, complementary each to one of said second and first coding algorithms, respectively, according to information provided with the abstract and concrete class and/or configuration information provided in a set up phase.

2. A method as claimed in claim 1, characterized in that the first and second algorithms are independently selected for different bands.

3. A method as claimed in claim 1 characterized in that the second coding algorithms code a quantization error obtained as a result of the application of the first coding algorithm.

4. A method as claimed in claim 1 characterized in that the first algorithms include linear prediction analysis coding algorithms at least for signals of a lower set of frequency bands, and shape/gain vector quantization coding algorithms for signals of higher frequency bands and for signals where linear prediction is not exploited.

5. A method as claimed in claim 1, characterized in that the second algorithms include shape/gain vector quantization coding algorithms.

6. A method as claimed in claim 1, characterized in that the selection of the first and second algorithm is carried out in dependence of configuration information passed from a user equipment (US) to coding devices (AC) and/or of control information passed from a transmission system (SY) to the coding devices.

7. A method as claimed in claim 1, wherein, before coding, each frame is divided into a plurality of subframes, characterized in that the length of said subframes is selectable out of a plurality of length values, so as to obtain a plurality of possible values of the coding delay.

8. A method as claimed in claim 1, characterized in that said frequency bands have a predetermined bandwidth, independently of a sampling frequency of the signal to be coded.

9. A method as claimed in claim 1, characterized in that the signal to be coded is sampled at any arbitrary input sampling frequency from 8 to 64 kHz and, before coding, it is upsampled to an internal sampling frequency which is the power of 2 immediately higher than the input sampling frequency; and in that this upsampling is disabled for input sampling frequencies of 8, 16 and 32 kHz.

10. A method as claimed in claim 1, characterized in that, for speech signal processing, the coding phase comprises the steps of:

selecting a standard-defined speech coding algorithm as first coding algorithm for a whole set of frequency bands;

building the basic layer with the core information generated by submitting the speech signal to the standard-defined algorithm; and building a coded signal corresponding to one of said intermediate layers or to the total layer, so as to obtain a coded signal upgraded with respect to the standard-defined coded signal;

and in that the decoding phase comprises the steps of a) decoding the only basic layer, or b) decoding the whole of the coded signal, depending on the availability of decoding algorithms and/or the quality to be attained for the decoded signal.

11. A method as claimed in claim 1, characterized in that the selection of the frequency bands to be submitted to at least the first coding step, the selection of the bands for which also second coding steps are to be performed and the number of second coding steps for a given frequency band are determined in dependency of the bandwidth and bit rate desired for the coded signal and on requirements of a user equipment (US) and of a system (SY) in which the coded signal is exploited, independently of the bandwidth and sampling frequency of the signal to be coded, on a frame per frame basis.

12. A method as claimed in claim 1, characterized in that the selection of the frequency bands to be submitted to the first coding step is carried out by the following operations:
a) determining a total bandwidth allocable to the coded signal for the available bit rate;
b) determining the energy associated to each band included in said bandwidth, and comparing said energy with a respective first energy threshold;
c) enabling insertion of core information for all bands of which the energy exceeds the respective threshold.

13. A method as claimed in claim 12, characterized in that the thresholds are constant thresholds.

14. A method as claimed in claim 12, characterized in that the thresholds are thresholds determined by exploiting a perceptual model.

15. A method as claimed in claim 1, characterized in that the selection of the bands to which said second coding steps are to be applied and the determination of the number of second coding steps for a given band comprise the following operations:
d) applying the whole of the second coding steps to each band;
e) determining the increase in signal quality afforded by each second step with respect to a previous one or to the first coding step in the same band;
f) enabling insertion into the coded signal of enhancement information blocks provided by second coding steps which allow the highest quality increases, until the available bit rate is completely exploited.

16. A method as claimed in claim 15, characterized in that said evaluation of the quality increase is carried out by exploiting a perceptual model.

17. A method as claimed in claim 1, characterized in that said audio signals are the audio component of multimedia signals.

18. A method as claimed in claim 1, characterized in that the audio signals to be coded are submitted to a said two-stage classification by which the signal in a given frame is allotted to one out of a plurality of abstract classes and to one out of a plurality of concrete classes of said one abstract class, the classification being used as control parameter for said splitting into frequency bands, said selection of the frequency bands to which a first coding algorithm and possibly a second coding algorithm are to be applied, and said determination of the number of second coding steps for a given frequency band.

19. A method according to claim 1, characterized in that said two-stage classification is made automatically.

20. A method according to claim 1, characterized in that said two-stage classification is driven by information passed from a user equipment (US).

21. A method according to claim 1, characterized in that said object bit streams are made up by packets of bits produced by individual coding steps and said macro-object bit stream (OB11 . . . 0821_) comprises: a first group of overhead bits (OVH1, OVH2) containing information regarding the classification results and the frequency bands being submitted to at least the first coding step; the packets of the core information; and, if second coding steps have been performed, a second group of overhead bit (OVH3) containing information regarding the number of coding steps performed for the different frequency bands having been submitted to at least the first coding step, and the packets of the enhancement information blocks; and in that bit streams of different macro-objects (OB11 . . . 0821) coded in the frame are transmitted in sequence, the transmission being preceded by a configuration phase in which a further group of overhead bits (OVHO) is transmitted, which group contains all service information necessary for the configuration of a decoder (AD).

22. A method as claimed in claim 21, characterized in that the bit packets within a macro-object bit stream are ordered by rank, the rank being related to the energy values of the different bands, in case of packets belonging to core information, and to the quality increase, in case of packets belonging to enhancement information.

23. A method as claimed in claim 22, characterized in that said scaling comprises the following steps:
a1) determining a bandwidth allocable in the frame to the or each macro-object for a desired bit rate;
b1) eliminating bit packets relevant to frequency bands which cause an exceeding of said bandwidth;
c1) if the residual bit rate exceeds the desired bit rate, eliminating one block of enhancement information for each band, starting from the band with the highest frequency, until the desired bit rate is attained or the core information only is left, the elimination being cyclically repeated, if necessary;
d1) if the residual bit rate at the end of step c1) still exceeds the desired bit rate, eliminating core packets of one or more frequency bands, starting from the highest frequency one.

24. A method as claimed in claim 1, characterized in that it further comprises a bit stream manipulation phase, carried out at one or a plurality of locations along a transmission path (1) between a coder (AC) and a decoder (AD), for stepwise bit rate and bandwidth scaling of the coded signal, each scaling step corresponding to suppression of one enhancement information block or, when no enhancement information block is present in the coded signal, to suppression of the core information of a frequency band.

25. A method as claimed in claim 1, characterized in that said bit stream manipulation phase is carried out at one or a plurality of locations upstream of a decoder (AD), and provides for a stepwise bit rate or bandwidth scaling of the coded signal, each scaling step corresponding to suppression of one enhancement information block or, when no enhancement information block is present in the coded signal, to suppression of the core information of a frequency band.

26. A method as claimed in claim 24, characterized in that said scaling comprises the following steps:
a2) determining a total bandwidth allocable in the frame to the or each macro-object for a desired bit rate;
b2) eliminating bit packets relevant to frequency bands which cause an exceeding of said bandwidth;

c2) if the residual bit rate exceeds the desired bit rate, eliminating one packet of enhancement information at a time, starting from the packet with the lowest rank, until the desired bit rate is attained or the core information packets only are left;

d2) if the residual bit rate at the end of step c2) still exceeds the desired bit rate, eliminating core information of one or more frequency bands, starting from the lowest rank band.

27. A method as claimed in claim 24, characterized in that said bit stream manipulation phase comprises the step of altering the value of predetermined coded parameters in individual macro-objects.

28. A method as claimed in claim 24, characterized in that said bit stream manipulation phase is performed simultaneously on a plurality of concurrent macro-objects, in such a way as to allot different bit rates and/or bandwidths to different macro-objects.

29. A method as claimed in claim 28, characterized in that said bit stream manipulation phase comprises the step of building a single bit stream at a predetermined bit rate including contributions from a plurality of concurrent macro-objects of which the overall bit rate exceeds the predetermined bit rate.

30. A method as claimed in claim 28, characterized in that said bit stream manipulation phase comprises the step of performing a level manipulation on the individual macro-objects, and the different bit rates and/or bandwidths allotted to the individual macro-objects are selected on the ground of that level manipulation.

31. A method as claimed in claim 24, characterized in that said bit stream manipulation phase is carried out on individually selected frames.

32. Apparatus for processing digitized audio signals, comprising:

an encoder (AC) arranged to receive frames of samples of an audio signal to be coded, having given bandwidth characteristics, and comprising: filtering means (FB1, FB2, FB3) for splitting the signal to be coded into a plurality of frequency bands, coding units (LCC, HCC, LEC, HEC) associated to each frequency band for the embedded coding of the signals of that band and comprising, for each band, a first coding unit (LCC, HCC), enabled for at least selected ones of the frequency bands and generating at each frame a core information for the respective band, and a set of second coding units (LCC, HCC), intended to generate a succession of enhancement information blocks for that band, the core information being the minimum amount of information needed for signal decoding; and means (BCU) for combining coded signals of the different frequency bands into a single embedded coded signal which comprises a basic layer, containing the core information of said selected frequency bands and corresponding to a minimum bit rate, a total layer, containing the whole of the coded information and corresponding to a maximum bit rate, and a plurality of intermediate layers which contribute to the coded signal by respective enhancement information blocks and cause an increase of the bit rate of the coded signal by successive steps from the basic layer to the total layer, and a decoder (AD) comprising: decoding units (LED, HED, LCD, HCD) for independently decoding the coded signal of the different frequency bands, and comprising, for each frequency band, a set of first decoding units (LED, HED), in one to one correspondence with the coding units of said second set (LEC, HEC) and intended each to decode an enhancement information block, and a second decoding unit (LCD, HCD) intended to decode the core information; and synthesis filtering means (FB4, FB5, FB6) for recombining the decoded signals of the different frequency bands and reconstructing a decoded signal with bandwidth characteristics corresponding to that of the original audio signal;

characterized in that the first coding unit (LCC, HCC) and each second coding unit (LEC, HEC) are configurable so as to apply to the signal being coded a first or respectively a second coding algorithm selected out of a plurality of first and second coding algorithms and each first decoding unit (LED, HED) and the second decoding unit (LCD, HCD) are configurable so as to apply to the signal being decoded a first or respectively a second decoding algorithm complementary to the second and the first coding algorithm, respectively, applied by the second and first coding units (LEC, HEC, LCC, HCC);

and in that it, further comprises:

a classification unit (CR) for submitting the audio signal to be coded to a two stage classification by which the signal is a given frame is allotted to one out of a plurality of abstract classes and to one out of a plurality of concrete classes of said one abstract class, the concrete classes being related with the characteristics of a signal portion and identifying elementary audio objects present in the frame and the abstract classes being related with the nature of to an audio signal and identifying macro-objects resulting from a combination of elementary audio objects; the classification unit (CR) providing the information on the classification to the filtering means (FB1 . . . FB3) and to said first and second coding units (LCC, HCC, LEC, HEC) as control parameter for said splitting into frequency bands, the enabling of selected first and second coding units (LCC, HCC, LEC, HEC) and the selection of a proper coding algorithm by the or each coding unit, and to said combining means (BCU) for insertion into the coded bit stream; and at least one bit stream manipulation unit (BMU), located upstream the decoder (AD), for bit rate or bandwidth scaling of the coded signal relevant to individual macro-objects and/or objects.

33. An apparatus as claimed in claim 32, characterized in that said encoder (AC) receives a signal sampled at any arbitrary input sampling frequency from 8 to 64 kHz, and further comprises means (MXU) for upsampling said signal at an internal sampling frequency which is the power of 2 immediately higher than the input sampling frequency; said upsampling means (MXU) being disabled for input sampling frequencies of 8, 16 and 32 kHz.

34. An apparatus as claimed in claim 32, characterized in that said filtering means (FB1 . . . FB3) in the encoder (AC) are configurable so as to generate frequency bands of predetermined bandwidth, independently of the sampling frequency of the signal to be coded.

35. An apparatus as claimed in claim 32, wherein the encoder (AC) comprises means (SF1, SF2) for dividing each frame into a plurality of subframes of which the duration is a submultiple of the frame duration, characterized in that the means (SF1, SF2) for dividing the frames are configurable so as to generate subframes of which the duration is selectable out of a plurality of duration values, so as to obtain a plurality of possible values of the coding delay.

36. An apparatus as claimed in claim 32, characterized in that the first and second coding units (LCC, HCC, LEC, HEC) of each band are configurable independently of the coding units of the other bands.

37. An apparatus as claimed in claim 32, characterized in that the first coding units (LCC, HCC) are configurable so as to apply linear prediction analysis coding algorithms at least for signals of lower set of frequency bands, and shape/gain vector quantization coding algorithms for signals of higher frequency bands and for signals where linear prediction is not exploited.

38. An apparatus as claimed in claim 32, characterized in that the second coding units (LEC, HEC) associated with a frequency band code a quantization error obtained as a result of the application of the first coding algorithm to signals in the same frequency band.

39. An apparatus as claimed in claim 32, characterized in that the second coding units (LEC, HEC) are configurable so as to apply shape/gain vector quantization coding algorithms to all frequency bands.

40. An apparatus as claimed in claim 32, characterized in that the first and second coding units (LCC, HCC, LEC, HEC) are enabled and configured, on a frame per frame basis, in dependency of the bandwidth and bit rate desired for the coded signal and of requirements of a user (US) and of a transmission system (SY), independently of the bandwidth and sampling frequency of the signal to be coded.

41. An apparatus as claimed in claim 32, characterized in that, for speech signal processing:
   a first coding unit (LCC) is configured so as to apply a standard-defined speech coding algorithm to a whole set of frequency bands;
   said combining means (BCU) are arranged to build the basic layer with the information generated by the application of the standard-defined algorithm and to build a coded signal corresponding to one of said intermediate layers or to the total layer, so as to obtain a coded signal upgraded with respect to the standard-defined coded signal;
   and in that the decoding units (LED, HED, LCD, HCD) are so configured as to decode either the only basic layer or the whole of the coded signal, depending on the availability of decoding algorithms and/or the quality to be attained for the decoded signal.

42. An apparatus as claimed in claim 32, characterized in that the enabling of said first and second coding units (LCC, HCC, LEC, HEC) is controlled by said combining means (BCU).

43. An apparatus as claimed in claim 32, characterized in that, for the enabling of the first coding units (LCC, HCC), said combining means (BCU) comprise means (BCL) which evaluate the energy of the signals in the different frequency bands and enable only first coding units (LCC, HCC) associated with bands where the energy exceeds a predetermined threshold.

44. An apparatus as claimed in claim 43, characterized in that said threshold is calculated by a processing unit (PMP) by exploiting a perceptual model.

45. An apparatus as claimed in claim 32, characterized in that, for the enabling of the second coding units (LEC, HEC), said combining means (BCU) comprise means (BCL) which evaluate an increase in the quality of the coded signal at the output of each second coding unit (LEC, HEC) with respect to the quality at the output of an immediately preceding second coding unit (LEC, HEC) or of the first coding unit (LCC, HCC) associated to the same band, only second coding units affording the highest quality increases being enabled.

46. An apparatus as claimed in claim 44 characterized in that said means (BCL) for the quality increase evaluation exploit information on a perceptual model provided by said processing unit (PMP).

47. An apparatus as claimed in claim 32, characterized in that said combining means (BCU) are arranged to combine, into an object bit stream, packets of bits produced by individual coding units (LCC, HCC, LEC, HEC) and containing all information relevant to a given concrete class for a single audio signal in one frame, and to combine the bit stream of the different objects of said audio signal in said frame into a macro-object bit stream (OB11 . . . OB21) which comprises: a first group of overhead bits (OVH1, OVH2) containing information regarding the classification results and the frequency bands for which at least the first coding unit (LCC, HCC) is enabled; the packets of the core information; and, if second coding units (LEC, HEC) are enabled, a second group of overhead bits (OVH3) containing information regarding the number of coding units enabled for the different frequency bands and the packets of the enhancement information blocks; and in that said combining means (BCU) are arranged to transmit, in a set up phase of a communication, all service information necessary for configuring the decoder (AD) in the same manner as the coder (AD), and then, during the communication, to transmit in sequence the bit streams of different macro-objects coded in the frame.

48. An apparatus as claimed in claim 47, characterized in that the combination means (BCU) are arranged to transmit the bit packets within a macro-object bit stream (OB11 . . . OB21) in an order of frequency band, starting with the lowest frequency band.

49. An apparatus as claimed in claim 48, characterized in that the combining means (BCU) are arranged to transmit the bit packets within a macro-object bit stream (OB11 . . . OB21) in an order or rank starting with those of the highest rank, the rank being related to the energy values of the different bands, in case of packets belonging to core information, and to the entity of the quality increase, in case of packets belonging to enhancement information.

50. An apparatus as claimed in claim 32, characterized in that said manipulation unit (BMU) is arranged to perform a stepwise scaling of the bit rate or the bandwidth, by suppressing a bit packet at each scaling step, starting from the packets provided by the second coding units (LEC, HEC) and continuing with packets provided by first coding units (LCC, HCC), when no packet provided by the second coding units (LEC, HEC) is present in the bit stream.

51. An apparatus as claimed in claim 50, characterized in that said bit stream manipulation unit (BMU) is arranged to manipulate the bit streams of individual objects or macro-objects in individually selected frames.

52. An apparatus as claimed in claim 50, characterized in that, for said scaling, said bit stream manipulation unit (BMU) is arranged to:
   determine a bandwidth allocable in the frame to the or each macro-object for a desired bit rate;
   eliminate bit packets relevant to frequency bands which lie beyond said bandwidth;
   eliminate one bit packet provided by a second coding unit (LEC, HEC) for each of the frequency bands which have been kept, starting from the band with the highest frequency, until the desired bit rate is attained or the core information only is left, the elimination being cyclically repeated, if necessary;

eliminate the bit packet provided by a first coding unit (LCC, HCC), for one or more frequency bands, starting from the highest frequency one.

53. An apparatus as claimed in claim 50, characterized in that, for said scaling, said bit stream manipulation unit (BMU) is arranged to:
   determine a bandwidth allocable in the frame to the or each macro-object for a desired bit rate;
   eliminate bit packets relevant to frequency bands which lie beyond said bandwidth;
   eliminate bit packets provided by second coding units (LEC, HEC), starting from the packet of lowest rank;
   eliminate the bit packet provided by a first coding unit (LCC, HCC), for one or more frequency bands, starting from the lowest energy band.

54. An apparatus as claimed in claim 50, characterized in that said bit stream manipulation unit (BMU) is arranged to alter the values of predetermined coded parameters in individual macro-objects.

55. An apparatus as claimed in claim 50, characterized in that said bit stream manipulation unit (BMU) is arranged to build a single bit stream at a predetermined bit rate including contributions from a plurality of concurrent macro-objects of which the overall bit rate exceeds the predetermined bit rate.

56. An apparatus as claimed in claim 55, characterized in that said bit stream manipulation unit (BMU) is arranged to manipulate the level of the individual macro-objects before building the single bit stream, and to select a bit rate and/or a bandwidth for the contribution of the individual macro-objects on the ground of the manipulated level.

* * * * *